US009248423B2

(12) United States Patent
Cerasani

(10) Patent No.: US 9,248,423 B2
(45) Date of Patent: Feb. 2, 2016

(54) HAND-HOLDABLE MIXING CONTAINER

(75) Inventor: Anthony Cerasani, Missoula, MT (US)

(73) Assignee: Platinum Products, LLC MT (US)

( * ) Notice: Subject to any disclaimer, the term of this patent is extended or adjusted under 35 U.S.C. 154(b) by 387 days.

(21) Appl. No.: 13/978,362

(22) PCT Filed: Jan. 10, 2012

(86) PCT No.: PCT/US2012/020818
§ 371 (c)(1),
(2), (4) Date: Jul. 3, 2013

(87) PCT Pub. No.: WO2012/096990
PCT Pub. Date: Jul. 19, 2012

(65) Prior Publication Data
US 2013/0279287 A1 Oct. 24, 2013

Related U.S. Application Data

(60) Provisional application No. 61/495,617, filed on Jun. 10, 2011, provisional application No. 61/431,352, filed on Jan. 10, 2011.

(51) Int. Cl.
*B01F 13/00* (2006.01)
*B65D 47/08* (2006.01)
*B65D 81/32* (2006.01)
*A47J 43/27* (2006.01)

(52) U.S. Cl.
CPC ............ *B01F 13/0022* (2013.01); *A47J 43/27* (2013.01); *B65D 47/0885* (2013.01); *B65D 81/3205* (2013.01)

(58) Field of Classification Search
CPC .................................................. B01F 13/0022
USPC ............ 366/130, 129; 206/219, 221; 220/568
See application file for complete search history.

(56) References Cited

U.S. PATENT DOCUMENTS

| 58,882 A * | 10/1866 | Pinder ........................... 366/130 |
| 1,060,419 A * | 4/1913 | Benjamin ...................... 366/130 |
| 1,075,119 A * | 10/1913 | Reichner ........................ 99/508 |
| 1,201,284 A * | 10/1916 | Gilchrist ....................... 366/130 |
| 1,661,336 A * | 3/1928 | Katz ............................. 366/130 |
| 1,748,483 A * | 2/1930 | Hyde ............................. 366/130 |
| 2,500,611 A * | 3/1950 | Kereluck ....................... 366/130 |
| 2,922,628 A | 1/1960 | Koe |
| 3,747,414 A * | 7/1973 | Ohno ........................... 215/11.1 |
| 3,820,692 A * | 6/1974 | Swett et al. ................... 366/130 |
| 4,003,555 A * | 1/1977 | Swartz .......................... 366/130 |
| 4,818,114 A * | 4/1989 | Ghavi ........................... 366/130 |
| 4,938,375 A | 7/1990 | Fantacone |

(Continued)

FOREIGN PATENT DOCUMENTS

| CA | 2 742 236 A1 | 5/2010 |
| KR | 20-0432667 Y1 | 12/2006 |
| KR | 10-0840962 B1 | 6/2008 |

*Primary Examiner* — Tony G Soohoo
(74) *Attorney, Agent, or Firm* — Seed IP Law Group PLLC

(57) ABSTRACT

A device for mixing having a housing with at least one wall and a closed bottom, a lid structured to be removably attached to the housing, and a mixing element mounted on one of the housing and the top, the mixing element having a first end mounted on at least one of the housing and the top and a second end that is coupled to the first end. The housing includes a storage component that is configured to be removably attached to the closed bottom of the housing.

17 Claims, 20 Drawing Sheets

(56) References Cited

U.S. PATENT DOCUMENTS

| | | | |
|---|---|---|---|
| 5,542,922 A * | 8/1996 | Petterson et al. | 215/11.1 |
| 5,547,275 A * | 8/1996 | Lillelund et al. | 366/130 |
| D374,150 S * | 10/1996 | Lillelund et al. | D7/387 |
| 5,788,369 A * | 8/1998 | Tseng | 366/130 |
| 6,202,542 B1 | 3/2001 | Melton | |
| 6,913,165 B2 * | 7/2005 | Linz et al. | 220/568 |
| D510,235 S | 10/2005 | Sorensen | |
| 2003/0029827 A1 * | 2/2003 | Renz | 215/11.1 |
| 2004/0047231 A1 | 3/2004 | Coll | |
| 2008/0156763 A1 * | 7/2008 | Murphy | 215/11.1 |
| 2009/0178940 A1 * | 7/2009 | Said | 206/221 |
| 2013/0279287 A1 * | 10/2013 | Cerasani | 366/130 |
| 2014/0231378 A1 * | 8/2014 | Roos | 215/387 |

\* cited by examiner

HAND-HOLDABLE MIXING CONTAINER

BACKGROUND

1. Technical Field

The present disclosure pertains to portable vessels for mixing and dispensing a flowable substance and, more particularly, to a hand-holdable device for storing, mixing, and dispensing a liquid material, preferably for human consumption.

2. Description of the Related Art

A variety of approaches have been taken to provide for hand operated or manual mixing of liquids or solids and liquids in a self-contained vessel. The most basic design utilizes a container with a removable lid that is shaken by hand to effectuate the mixing together of two or more liquids or a dry substance and a liquid, such as depicted in U.S. Pat. No. D510,235.

An improvement over this approach is found in U.S. Pat. No. 2,922,628 entitled Mixing Device, in which two fluted shafts are mounted inside individual coil springs. A handle at the top of the shafts is depressed to cause the shafts and springs to rotate as the springs are compressed, and the handle is biased upwards by the compressed springs when pressure is released to cause rotation of the shafts and springs in an opposite direction. Due to its size, such a design is suitable only in an open container, such as a mixing bowl. It is also mechanically complex and difficult to maintain and clean.

In U.S. Patent Application Publication No. 2004/0047231, a mixing structure, such as a wire ball, basket, or conical object with through-holes is placed inside a bottle that is manually shaken to mix a powder with a liquid, such as infant formula with water. Drawbacks of this design include inadequate mixing because the mixing structure moves with the liquid, repeated impact of the mixing structure with the container walls, scratching and otherwise damaging the container and possibly causing material to break off the mixing structure or the container or both, as well as the noise generated by the contact.

BRIEF SUMMARY

In accordance with the present disclosure, a container is provided that is designed to be shaken manually to cause mixing of elements within the container. The container is a hand-held device for mixing that includes a housing having an interior defined by at least one wall and a closed bottom, a lid structured to be removably attached to the housing, the lid having a sealable spout, and a storage compartment structured to be removably attached to the closed bottom of the housing.

In an alternative embodiment, a device for mixing is provided that includes a housing having an open end, a closed end, and an interior defined by at least one wall that separates the open end and the closed bottom, the housing also including a ledge positioned on a first interior surface of the wall adjacent to the open end, a lid structured to be removably attached to the housing, the lid having a sealable spout, a storage compartment structured to be removably attached to the closed bottom of the housing, and a mixing element having a first end and a second end that is narrower than the first end, the first end configured to be received in the interior of the housing and supported on the housing by the ledge.

In accordance with one aspect of the present disclosure, a device for mixing is provided, the device including a housing having at least one wall and a closed bottom; a top structured to be removably attached to the housing; and a mixing element mounted on one of the housing and the top, the mixing element having a first end mounted on at least one of the housing and the top and a second end that is coupled to the first end via a compliant portion structured to move along a longitudinal axis of the mixing element, such as when subjected to a force along the longitudinal axis.

In accordance with another aspect of the disclosure, the mixing element is formed of a length of filament that is coiled to form a spring having a plurality of contiguous ringlets concentric to the longitudinal axis, the spring structured to collapse from an original shape along the longitudinal axis of the spring in a first direction when subjected to a force in the first direction along the longitudinal axis of the spring and return to the original shape when not subjected to the force in the first direction, the spring further structured to expand from the original shape along the longitudinal axis of the spring in a second direction when subjected to a force in the second direction along the longitudinal axis and return to the original shape when not subjected to the force in the second direction.

In accordance with a further aspect of the present disclosure, the compliant portion of the spring has a longitudinal space between each ringlet when the spring is in the original shape to allow the spring to collapse and extend. In one form, the ringlets in the compliant portion of the spring are ideally formed to have a progressively reducing diameter from the first end of the spring to the second end of the spring to form a cone shape, the complaint portion of the spring having a longitudinal separation between each ringlet to allow the spring to collapse and extend. Preferably, the second end of the cone-shaped spring is truncated to form a closed portion, preferably planar, to form a paddle that aids in mixing.

In accordance with a yet another aspect of the present disclosure, the spring has at least one loop extending longitudinally from the first end and away from the second end, the at least one loop having a circumferentially positioned to define an opening that is radially oriented to engage a corresponding extension on one of the container and the top.

As will be readily appreciated from the foregoing, the present design provides a dynamic mixing element that improves the ability to manually mix substances in a closed hand-holdable container. The recoiling spring mounted inside the container, either on the container itself or on the removable top with easily releasable loops, increases agitation without requiring extra force or energy. In addition, the additional mixing power is quiet because the mixing element does not collide with the container wall during mixing as do the free floating objects of prior designs. The removable cup on the bottom provides storage as well as a cup in which to dispense the mixed material through the top of the container.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with hand-holdable containers have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
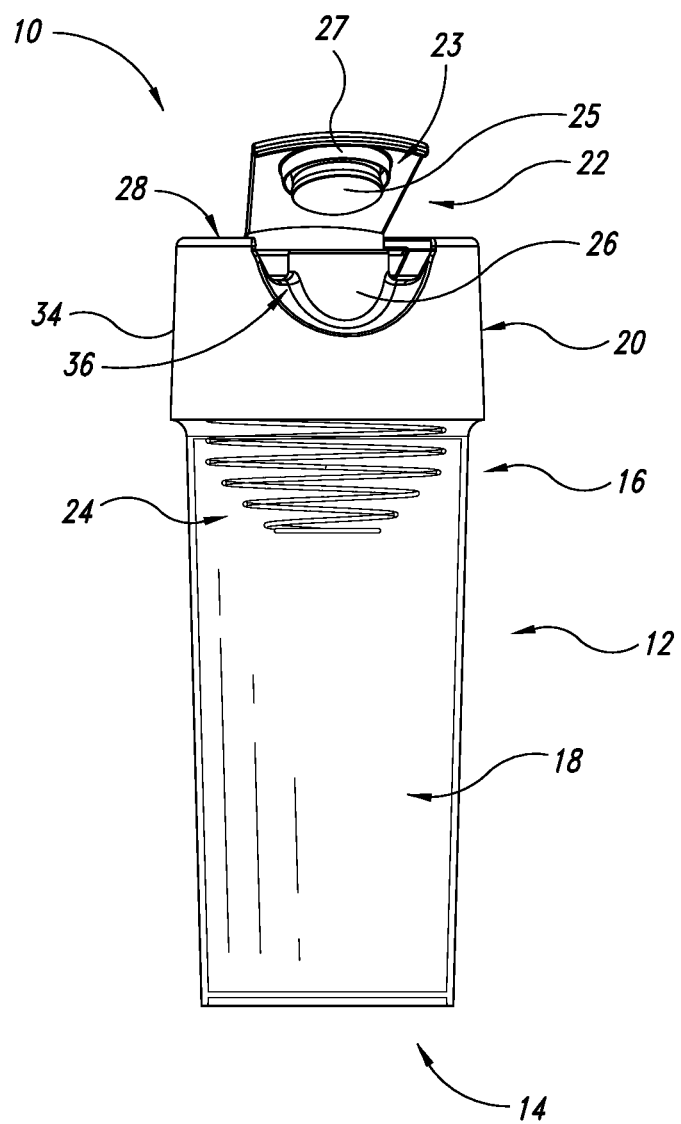
FIG. 1 is a front plan view of a hand-holdable mixing container formed in accordance with one aspect of the present disclosure.

Referring initially to FIG. 1, shown therein is a mixing container 10 formed in accordance with the present disclosure, which includes a container housing 12 with a closed bottom 14 and an open top 16 (shown in FIG. 3) to define a hollow interior 18. A removable lid 20 is engaged with the container housing 12 to cover the open top 16. The removable top includes a dispensing tab 22 that can be selectively opened and closed.

Positioned inside the container housing 12 is a mixing element 24 that can be removably attached to the lid 20 or the container housing 12, although in a preferred embodiment the mixing element 24 is removably attached to the lid 20, as will be described in more detail hereinbelow.

Ideally, the container housing 12 is formed of scratch-resistant, double-wide walls for durability. In the embodiment shown in FIG. 1, the housing container has a circular cross-sectional configuration. However, it is to be understood that other configurations, such as square or oblong, may be used. In addition, embossed ounce and millimeter markings may be provided to facilitate measuring and dispensing of material in the housing container as well as to facilitate the calculation of calories. Ideally, the container housing 12 is formed of substantially transparent material, although it may be tinted in different colors for appeal.

The lid 20 may be threadably engaged with the open top 16 of the housing 12 or it may snap in place. The preferred embodiment has the lid 20 threadably engaged with the open top 16 to prevent leakage.

The dispensing tab 22 can be in the form of a flip cap that snaps securely in place to prevent accidental leakage of fluid from inside the container 12. The tab 22 can unsnap and be removed or be pivotally attached to the lid 20 to open and close. The lid 20 thus has a dispensing spout 26 from which the contents of the container housing 12 can be poured into another container. Optionally, a user can drink directly from the dispensing spout 26.

The tab 22 includes a stopper assembly 23 having a first portion 25 that fits into an interior of the spout 26 and a second portion 27 that fits over an exterior of the spout 26 to ensure the tab 22 seals the spout 26. As in FIG. 3, the tab 22 may be coupled to the lid 20 to allow the tab to rotate from a closed to an open position. Protrusions 29 on each side of the tab 22 engage with indentations 31 in the lid 20 to allow the tab 22 to rotate.

Figure 4:
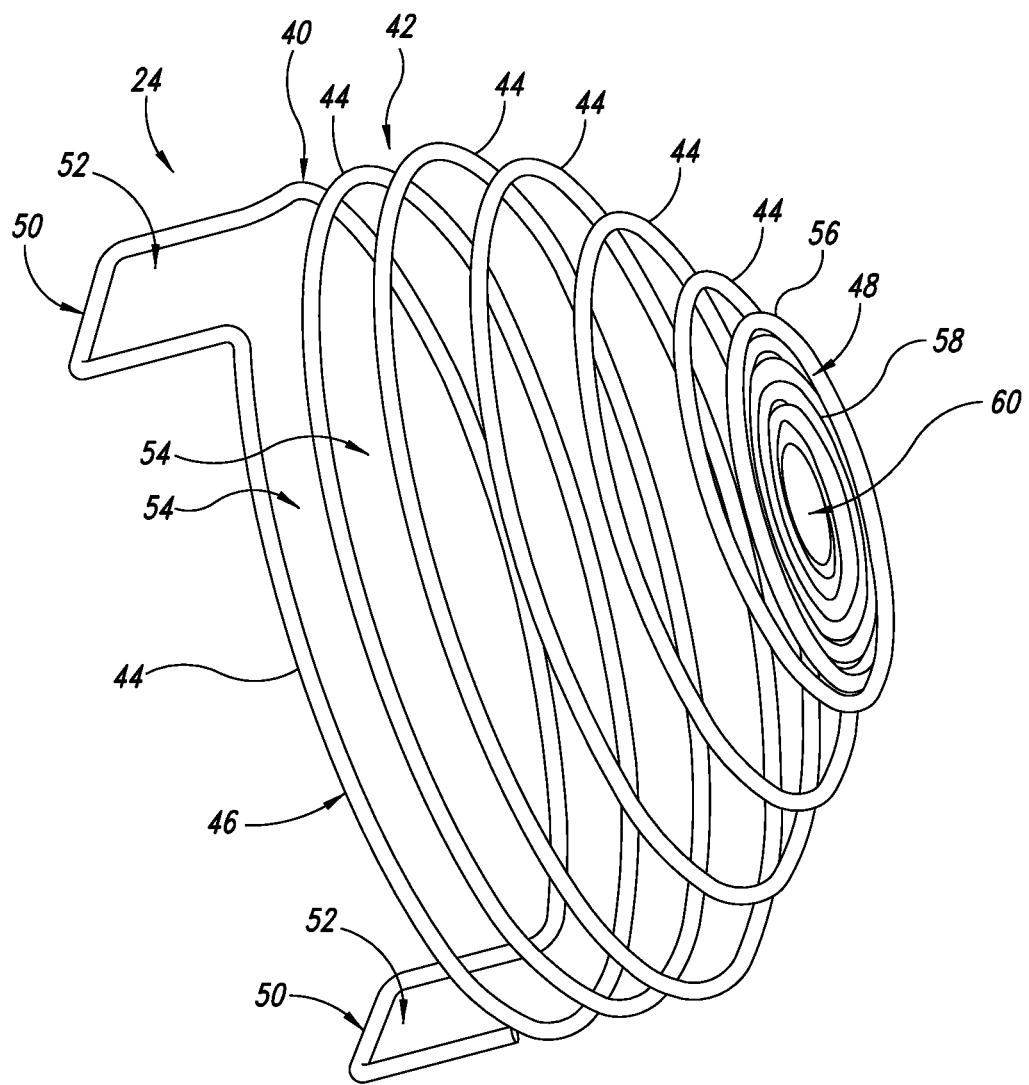
FIG. 4 is an isometric view of a mixing element used in the embodiments of FIGS. 1 and 2.
Figure 5:
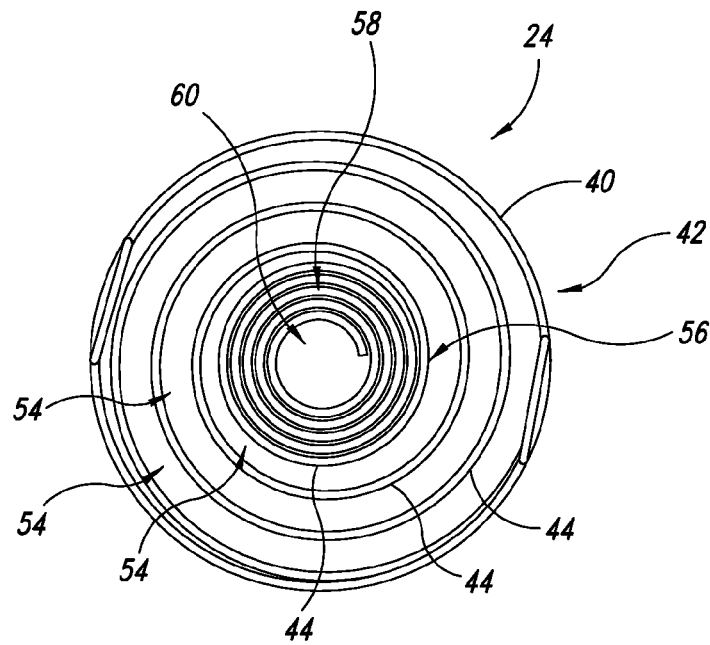
FIG. 5 is a bottom plan view of the mixing element of FIG. 4.
Figure 6:
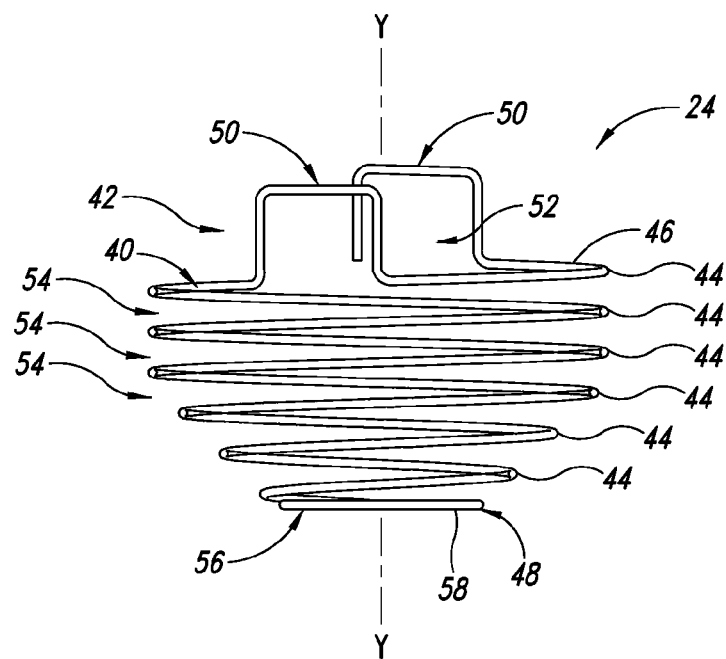
FIG. 6 is a side plan view of the mixing element of FIG. 4.

The mixing element 24, which is shown more clearly in FIGS. 4-6, is fixedly but removably attached to the lid 20 to project into the hollow interior 18 of the container housing 12.

Figure 2:
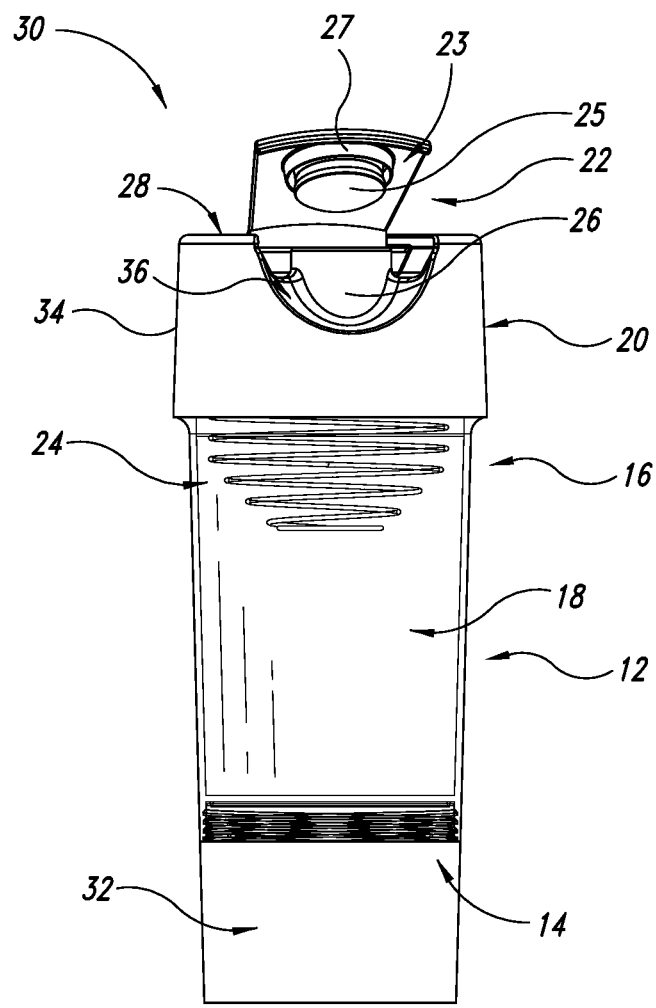
FIG. 2 is a front plan view of an alternative embodiment of the container of FIG. 1 formed in accordance with the present disclosure.

In FIG. 2, an alternative embodiment of the present disclosure is provided in which a container 30 has a removable cup 32 threadably engaged to the exterior closed bottom 14 of the container housing 12. This cup 32 can be used to store ingredients to be mixed in the housing 12 and for use in drinking liquid materials poured from the container 30. For example, a high-energy protein mix can be stored in the cup while a liquid can be stored in the housing 12. When it is time to mix the two together, the cup 32 is removed and the contents, either liquid or solid, such as a powder, are poured into the housing 12 through the open top 16 (after the lid 20 is removed). The lid 20 is then securely screwed onto the housing 12, and the container 30 is vigorously shaken by a user to mix the contents therein.

It is to be understood that the contents can be two or more liquids, a liquid and a dry substance, such as a powder, or various combinations of the foregoing. The present disclosed design is configured for use with flowable materials, such as liquid drinks.

Figure 3:
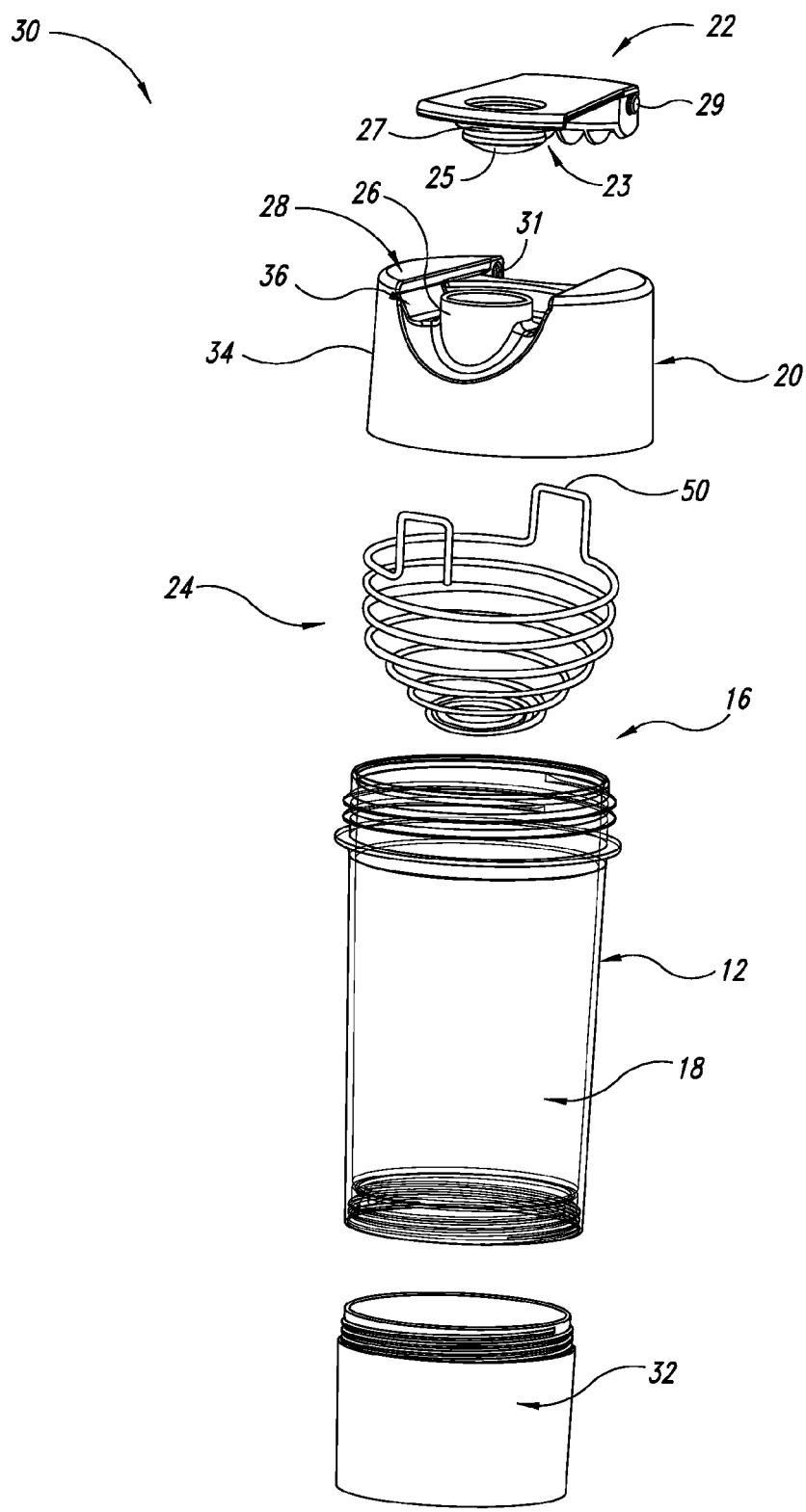
FIG. 3 is an isometric exploded view of the container of FIG. 2.

The lid 20 is formed to have the spout 26 projecting no higher than a top surface 28 of the lid. To facilitate pouring, a portion of the sidewall 34 of the lid 20 is removed adjacent the pouring spout 26. As shown in FIGS. 1-3, the removed portion leaves a semi-circular cutout 36 in a portion of the sidewall 34 that provides access to the spout 26 for drinking by a user or pouring into the cup 32 or another container. The shape of the cutout 36 is immaterial so long as sufficient material is removed to provide access to the spout 26. Thus, the radius of curvature, the angle of the cutout 36 and other aspects of its appearance are for cosmetic purposes and serve no functional purpose.

FIG. 3 is an exploded isometric view of the container 30 of FIG. 2. The mixing element 24 includes loops 50 that provide a user with a way to grab the mixing element to remove it from the container housing 12. Alternatively, the loops 50 may be engaged with an interior piece (not shown) of the lid 20 so that the mixing element 24 is attached to the lid 20 for easy removal.

Referring next to FIGS. 4-6, shown therein is the mixing element 24. One unique aspect of the present disclosed embodiments is the use of a mixing element having one end that is fixedly but removably attached to the container, such as the lid, and a second end that is appended to the first end by a compliant section that allows the second end to move relative to the first end, both toward and away from the first end. In other words, the mixing element 24 has an original shape that can change in response to forces acting upon the mixing element 24, such as to collapse and extend in length along a longitudinal axis of the mixing element 24.

In the preferred embodiment shown in FIGS. 4-6, the mixing element 24 is formed of a length of filament 40 that is coiled to form a spring 42 having a plurality of continuous ringlets 44 concentric to the longitudinal axis Y (shown in FIG. 6) of the mixing element 24. The ringlets 44 start at a first or top end 46 and continue through to a second end 48 of the spring 42. At the top or first end 46, the first ringlet 44 has a pair of partially formed loops 50 positioned circumferentially at the top of the spring 42 to extend away from the second end 48. Each loop 50 defines an opening 52 that is radially oriented to engage a corresponding extension on one of the container and the top. Preferably, the extension is formed on the top, as described in more detail below. The openings 52 thus provide a way to positively engage the mixing element 24 with the container, preferably the lid 20, so that the first end 46 remains substantially stationary.

The plurality of ringlets 44 are separated by a longitudinal space 54 formed between each ringlet 44. The longitudinal spacing 54 between the ringlets 44 allows the ringlets 44 to collapse together and to extend apart in response to a force exerted on the mixing element 24. Thus, the filament 40 that forms the mixing element 24 is formed of compliant material that returns to its original shape after a force to which it is subjected is removed.

In a preferred embodiment, the ringlets 44 in a compliant portion of the spring 42 having a progressively reducing diameter from the first end 46 to the second end 48 of the spring 42 to form a cone shape. Thus, the compliant portion of the spring is formed by the longitudinal separation between the ringlets 44 that allows the spring 42 to collapse and extend along the longitudinal axis Y.

At the second end 48 of the spring 42, the final ringlet 56 is enclosed through at least a portion of the diameter of the plane defined by the ringlet 56 to form a substantially planar portion 58. A central opening 60 is provided in the planar portion 58 to allow liquid to flow therethrough. The planar portion 58 thus acts as a paddle to facilitate agitation of substance in the container housing 12 as the spring 42 collapses and extends in response to a shaking force applied to the container 10, 30.

Due to the nature of its construction, the spring 42 does not move laterally with respect to the longitudinal axis Y, thus protecting the housing 12 from scratching and damage due to contact with the spring 42 as it extends and collapses.

It is to be appreciated that the spring 42 can have other configurations, such as cylindrical, square, or other polygon cross-sectional shape, such as to match the cross-sectional configuration of the housing 12.

The mixing element 24 in the configuration described above provides a dynamic mixing to materials in the housing 12 inasmuch as it moves only when the housing 12 is subjected to an outside force, such as shaking by a user.

Figure 7:
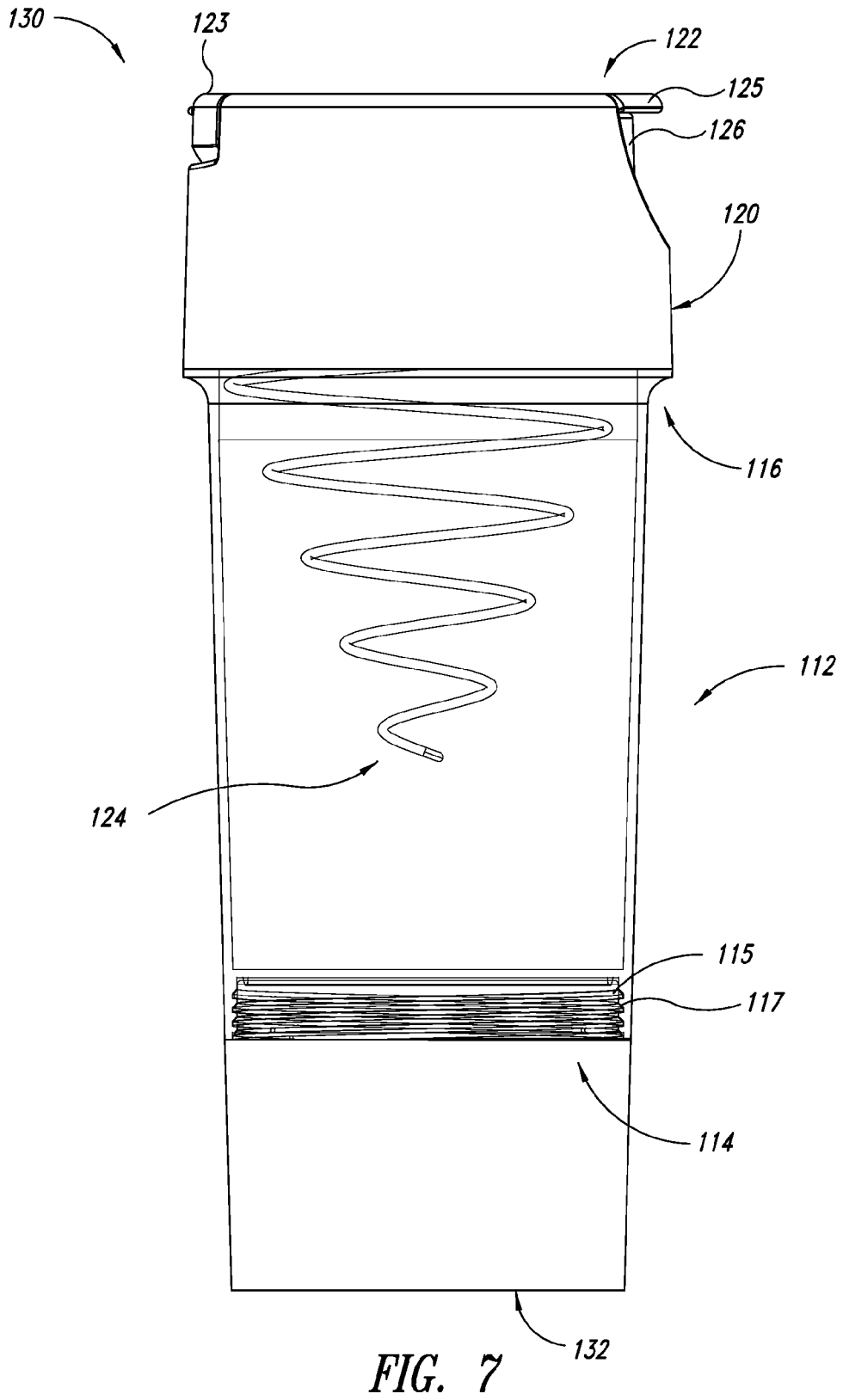
FIG. 7 is a side plan view of an alternative embodiment of a hand-holding mixing container formed in accordance with one aspect of the present disclosure.

In FIG. 7, an alternative embodiment of the present disclosure is provided in which a container 130 has a removable cup 132 threadably engaged to an exterior closed bottom 114 of a container housing 112. This cup 132 can be used to store ingredients that are to be mixed in the housing 112. In addition, it can be used in drinking liquid materials poured from the container 130. For example, a high-energy protein mix can be stored in the cup while a liquid can be stored in the housing 112. When it is time to mix the two together, the cup 132 is removed and the contents thereof, either liquid or solid, such as a powder, are poured into the housing 112 through an open top 116 (after a lid 120 is removed). The lid 120 is then securely screwed onto the housing 112, and the container 130 is vigorously shaken by a user to mix the contents therein.

The container 130 includes a mixing element 124 that is configured to mix the powder into the liquid. The lid 120 and the housing 112 work together to keep a first end 146 (see FIGS. 10A and 10B) of the mixing element 124 fixed as the container 130 is shaken to mix the contents.

The lid 120 includes a sealing tab 122 that is configured to hinge from an open position to a closed position to provide access to and to seal the spout 126. In this embodiment, a first end 123 of the tab 122 is coupled to the lid 120 an allows the tab 122 to rotate from the first end 123. A second end 125 is configured to rotate up and away from the spout 126 so that the spout 126 is available for use or can be sealed for transport.

Figure 8:
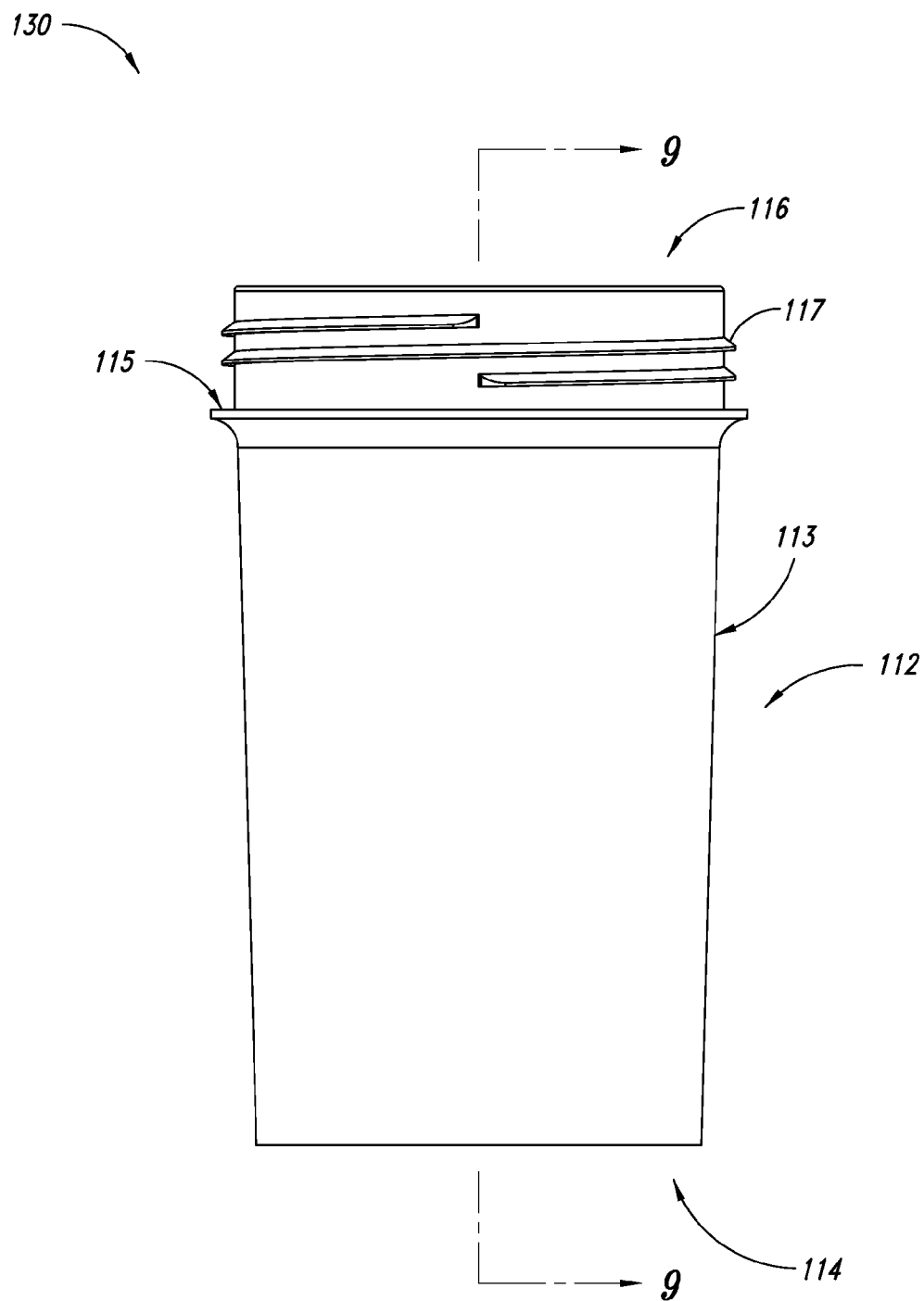
FIG. 8 is an enhanced side view of a container housing of FIG. 7.
Figure 9:
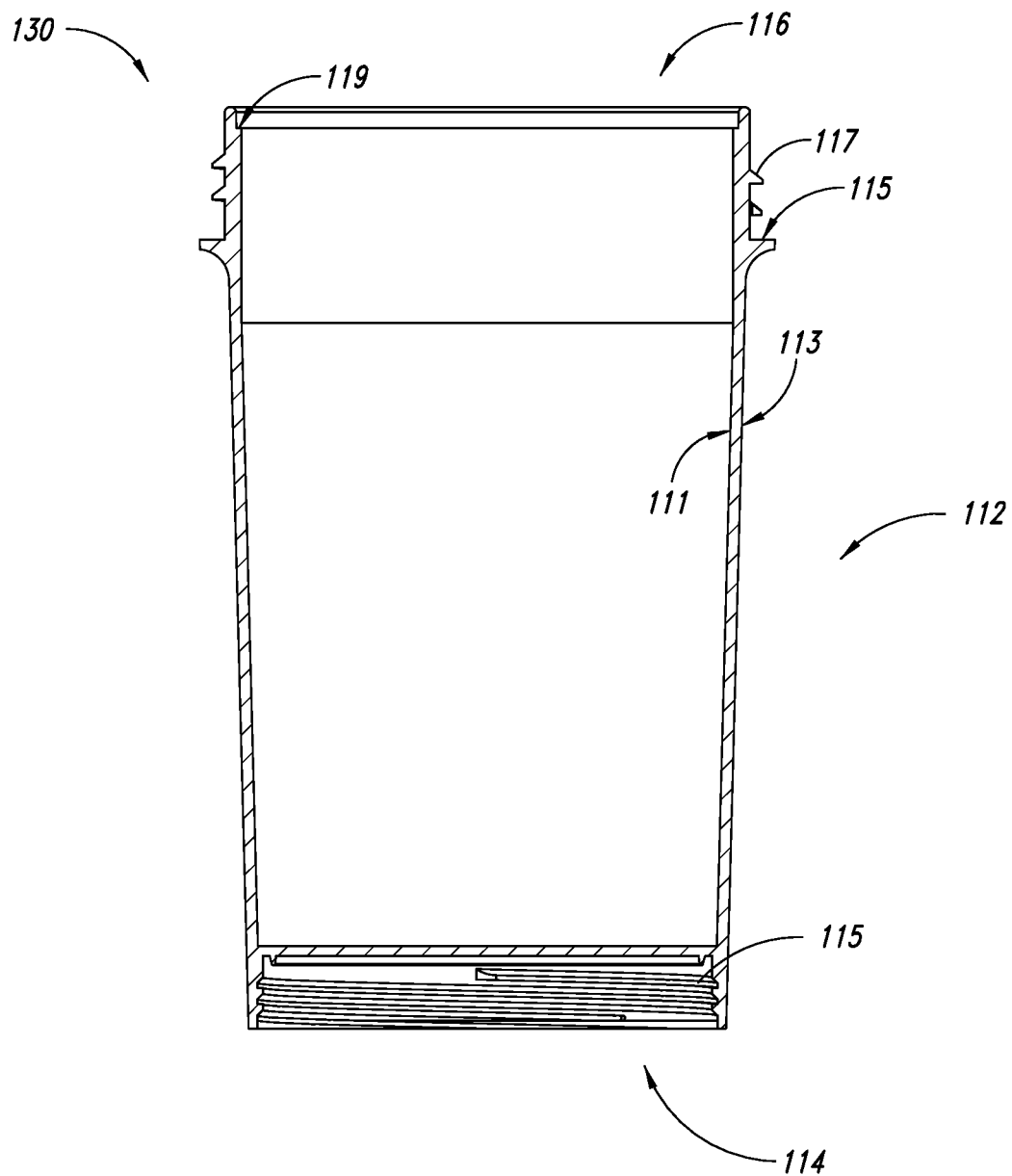
FIG. 9 is a cross-sectional view of the container housing of FIG. 8.

FIGS. 8 and 9 are side and cross-sectional views, respectively, of the housing 112 of FIG. 7. The housing in FIG. 7 is illustrated as transparent so that threads 115 of the housing 112 coupled with threads 117 of the cup 132 are visible. In FIGS. 8 and 9, the housing 112 is shown as opaque, such that the threads 115 are not visible. The housing 112 has an interior wall 111 and exterior wall 113. The exterior wall 113 includes a circumscribing shoulder 115 and a spiral shaped external thread 117 formed around an upper portion of the housing 112. The external thread 117 is configured to mate with internal threads on the lid 120 to threadably attach the lid 120 to the container 130 and provide a liquid seal therebetween.

As shown more clearly in FIG. 9, the container housing 112 has the interior wall 111 that includes a circumscribing internal shelf 119 formed adjacent to the opening 116 of the container 112. The shelf 119 is configured to receive the largest ring on a first end 146 of the mixing element 124. A feature extending from the lid 120, described further below, pushes the ring on the first end 146 of the mixing element 124 into engagement with the shelf 119 and holds the first end 146 in place as the container 120 is shaken to mix powder and liquid contained therein. The threads 115 are formed in a spiral configuration that is configured to mate with the threads on the cup 132.

Figure 10A:
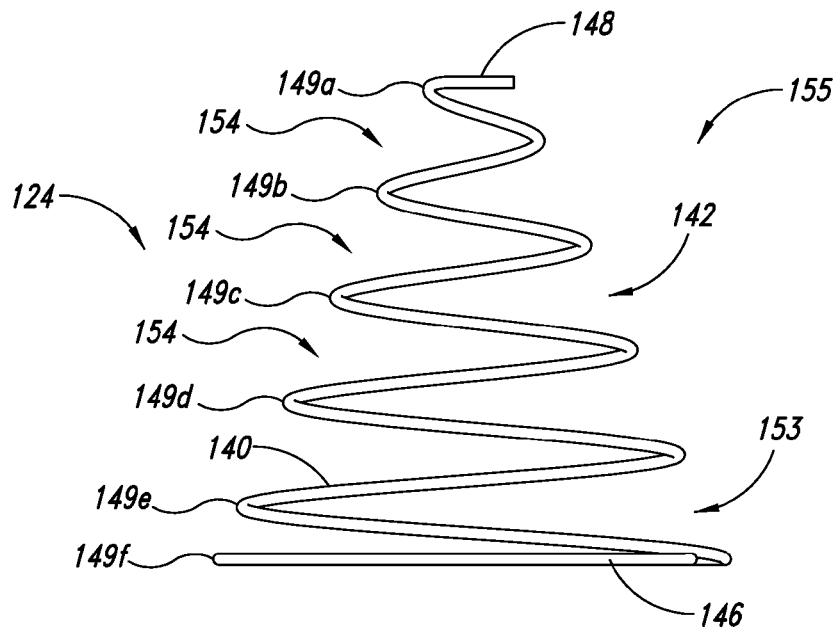
FIGS. 10A and 10B are side and top views of a mixing element used in the embodiment of FIG. 7.
Figure 10B:
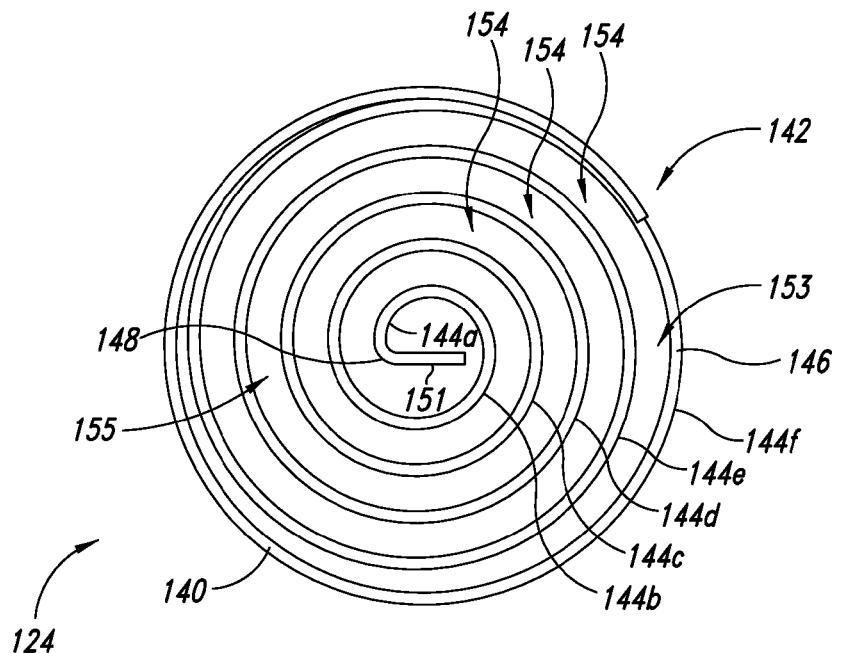

FIGS. 10A and 10B are side and top views, respectively, of the cone-shaped mixing element 124 of FIG. 7 formed of a single spiral of metal, such as spring steel. The first end 146 of the mixing element 124 has the largest ring of the multiple turns of the spiral, and is structured to be fixedly, but removably, held in place in the container 130 to aid in breaking up and mixing of powder. A second end 148 of the mixing element 124 is appended to the first end 146 by a compliant section that allows the second end to move relative to the first end both vertically and laterally.

More particularly, the mixing element 124 is formed of a length of filament 140 coiled to form a spring 142 having a plurality of continuous concentric circular ringlets 144a-144f. The filament 140 is of a particular gauge or thickness that allows limited movement of the second end 148 toward the first end 146 during shaking, but does not allow complete collapse of the spring 142 to the first end 146. The filament 140 is relatively rigid to provide a somewhat immobile mixing element in the housing 112 that is configured to break apart and mix the powder. The filament 140 that forms the mixing element 124 is formed of compliant material that returns to its original shape after a force to which it is subjected is removed.

The ringlets 144a-144f begin with a first ringlet 144a having a first diameter at the first end 146 and each consecutive concentric ringlet 144 has a progressively smaller diameter than the previous ringlet. In a resting position, the ringlets 144a-144f are separated from each other by a plurality of openings 154. During mixing, a size of each opening 154 can vary depending on the force used to shake the container 130. A shape of the mixing element 124 changes based on the forces applied, such that the second end 148 moves towards and away from the first end 146.

The ringlets 144e and 144f nearest the first end 146 are the most compliant ringlets and form a compliant portion 153 of the mixing element 124. During mixing or shaking, the compliant portion 153 produces the most movement. The other ringlets 144a-144d generally retain their resting shape during mixing so that the mixing element 124 has a relatively fixed portion 155 that is moved in the fluid by the compliant portion. Having this relatively fixed portion 155 and the compliant portion 153 allows for some lateral movement of the mixing element 124. However, the lateral movement of the mixing element is limited and does not scratch the interior wall 111 of the housing 112.

The mixing element 124 includes a first straight portion 151 that forms the second end 148 and extends into the first ringlet 144a. The first straight portion 151 allows liquid to flow into and out of the mixing element while providing an additional object to break up any clumps of powder that may be moving through the liquid.

FIGS. 11-14 are various views of the lid 120. The lid 120 is formed to have a spout 126 projecting no higher than a top surface 128 of the lid 120. To facilitate pouring, a portion of a sidewall 136 of the lid 120 is removed adjacent the pouring spout 126. The removed portion leaves a semi-circular cutout 134 in a portion of the sidewall 136 that provides access to the spout 126 for drinking by a user or pouring into the cup 132 or another container. The shape of the cutout 134 is immaterial so long as sufficient material is removed to provide access to the spout 126. Thus, the radius of curvature, the angle of the cutout 134 and other aspects of its appearance are for cosmetic purposes and serve no functional purpose.

Figure 11:
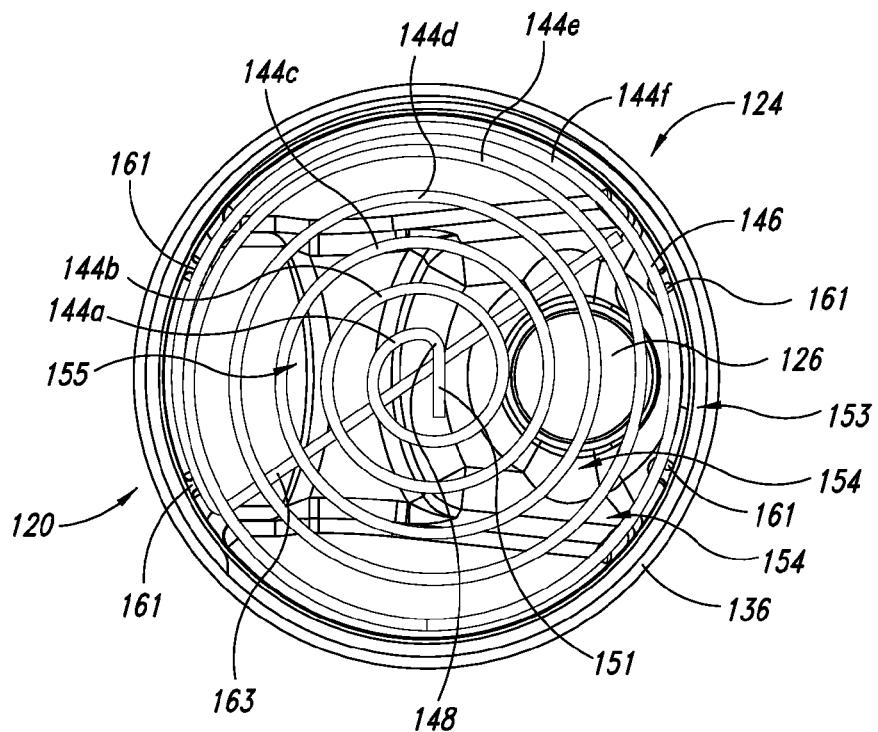
FIG. 11 is a bottom view of a lid with an alternative embodiment of the mixing element of FIG. 7.

As shown in FIG. 11, the lid 120 includes a plurality of receiving members 161 that cooperate with the shelf 119 to securely hold the first end 146 of the mixing element 124 in the container 130 when the lid 120 is in place. The receiving members 161 have a surface 163 that contacts the first end 146 of the mixing element 124. The surface 163 has an area that covers at least a portion of the first end 146 to prevent the mixing element from moving during shaking of the container 130. The receiving members 161 are structured in this embodiment as pillars of material formed integrally with the sidewalls 136 of the lid 120. The shape and number of the receiving members 161 can vary based on the size and structure of the lid 120.

FIG. 11 includes an alternative embodiment of the mixing element 124 that includes a gripping bar 163 formed integrally with the filament 140. The gripping bar 163 is a straight portion of the filament 163 that extends across the diameter of the first end 146. The gripping bar 163 provides users with a way to remove the mixing element 124 from the housing 112.

Figure 12:
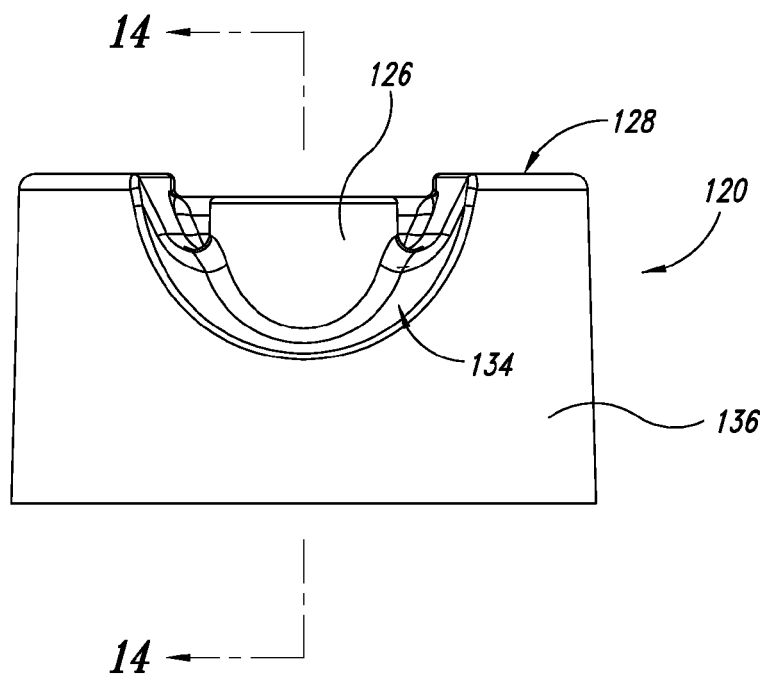
FIG. 12 is a side view of the lid of FIG. 11.
Figure 13:
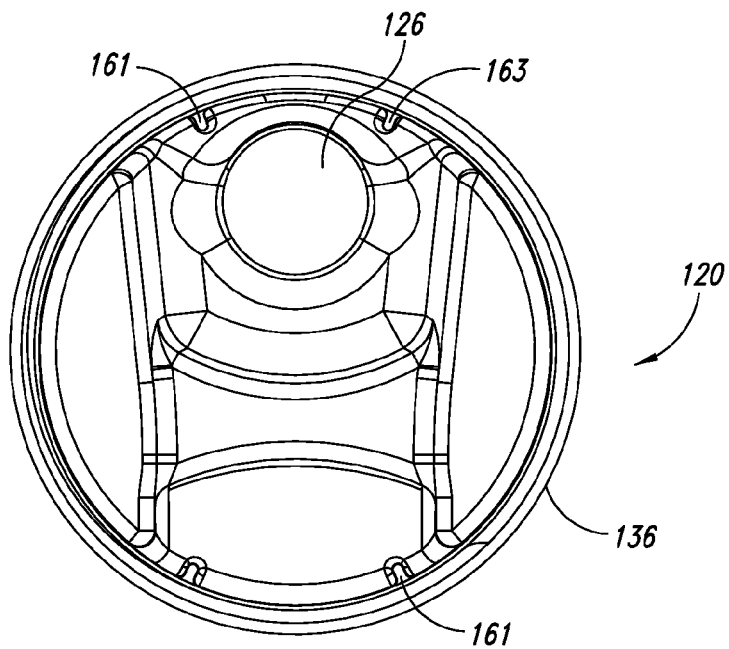
FIG. 13 is a bottom view of the lid of FIG. 11.
Figure 14:
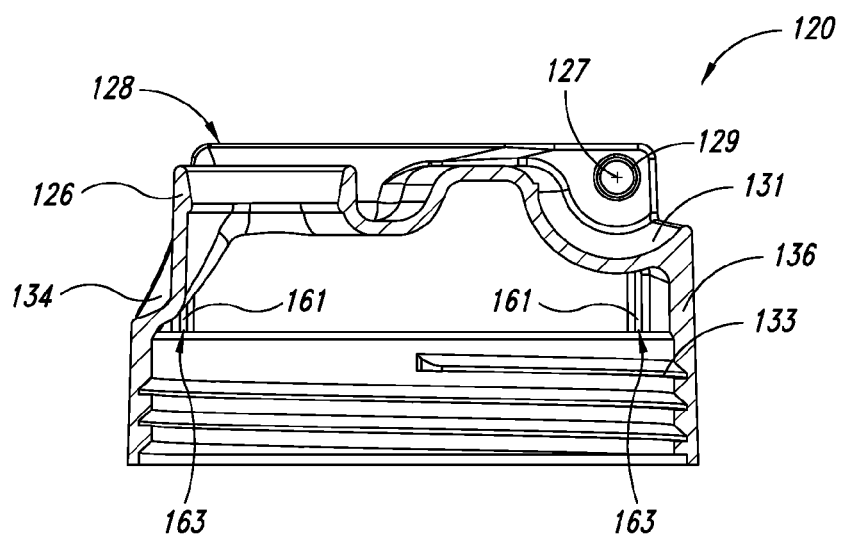
FIG. 14 is a cross-sectional view of the lid in FIGS. 11-13.

FIG. 14 is a cross-sectional view of the lid 120 of FIG. 12 taken through the spout 126. The tab 122 (not shown in this cross-section) is coupled to the lid 120 in a manner that allows rotation of the first end 123 around an axis 127. An opening 131 provides space for the first end 123 of the tab 122 to rotate without contacting other portions of the lid 120. As mentioned above, the spout 126 ends below the surface 128 of the lid 120, which provides room for the tab 122 to engage with the spout 126 and be flush with the surface 128. The lid 120 includes indentations 129 that are configured to receive the protrusions of the tab 122 and allow the tab 122 to rotate. The lid also includes threads 133 that are formed in a spiral configuration and are configured to merge with threads of the housing 112 to couple the lid 120 to the housing 112.

Figure 15:
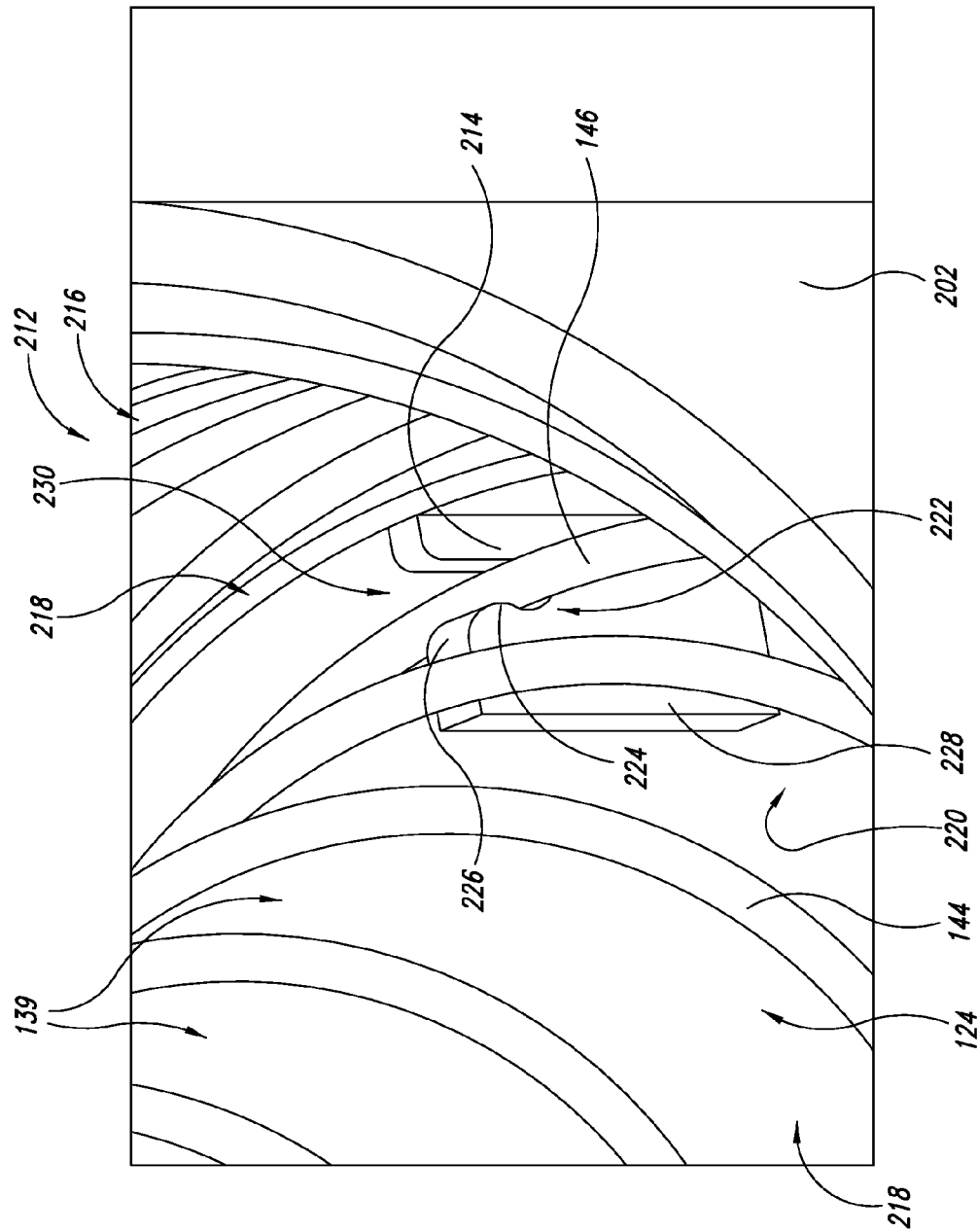
FIG. 15 is an enlarged view of a receiving member of a lid and a mixing element formed in accordance with an alternative embodiment of the present disclosure.

FIG. 15 is an enhanced view of an alternative embodiment of a lid 202 that is configured to receive and retain the first end 146 of the mixing element 124 in the container 130 during shaking. The lid 202 includes internal threads 212 to securely couple the lid 202 to the container. The threads 212 are formed on a first portion 216 of the lid 202. A second portion 218 of the lid is configured to receive and retain the mixing element 124. The spout 126 and a top interior surface 220 of the lid 212 are part of the second portion 218.

A plurality of receiving members 214 are formed integrally with the lid 202 on the second portion 218. The receiving members 214 are configured to receive and retain the first end 146 of the mixing element 124 adjacent to the interface between the first and second portion 216, 218. The receiving members 214 are sized and shaped to lock the mixing element 124 into place so that the mixing element is fixedly attached to the lid during shaking.

The receiving members 214 are structured to have a radially oriented rectangular base 228 that extends from the interior surface 220 of the lid 202 towards the interior thereof. In the base 228, an opening 230 is formed that opens to the upper exterior edge of the base 228 and terminates in a channel 222 that is configured to receive the first end 146 of the mixing element 124. A narrowing member 224 in conjunction with a sloped sidewall 226 of the channel 222 allow the first end 146 of the mixing element 124 to easily snap into the curved end 222 and be held in place. The narrowing member 214 extends into the opening 230 to securely retain the first end 204 in frictional engagement.

The mixing element 124 is similar to the mixing element discussed above, but may include more ringlets 144 from the first end 146 to the second end 148. More ringlets 144 may result in a stiffer mixing element 124 with smaller spaces 154 between the ringlets 144. Alternatively, the mixing element 124 may have a larger diameter container. The larger diameter may require more ringlets 144 to achieve the relatively compliant portion 153 and the relatively rigid portion 155.

Figure 25:
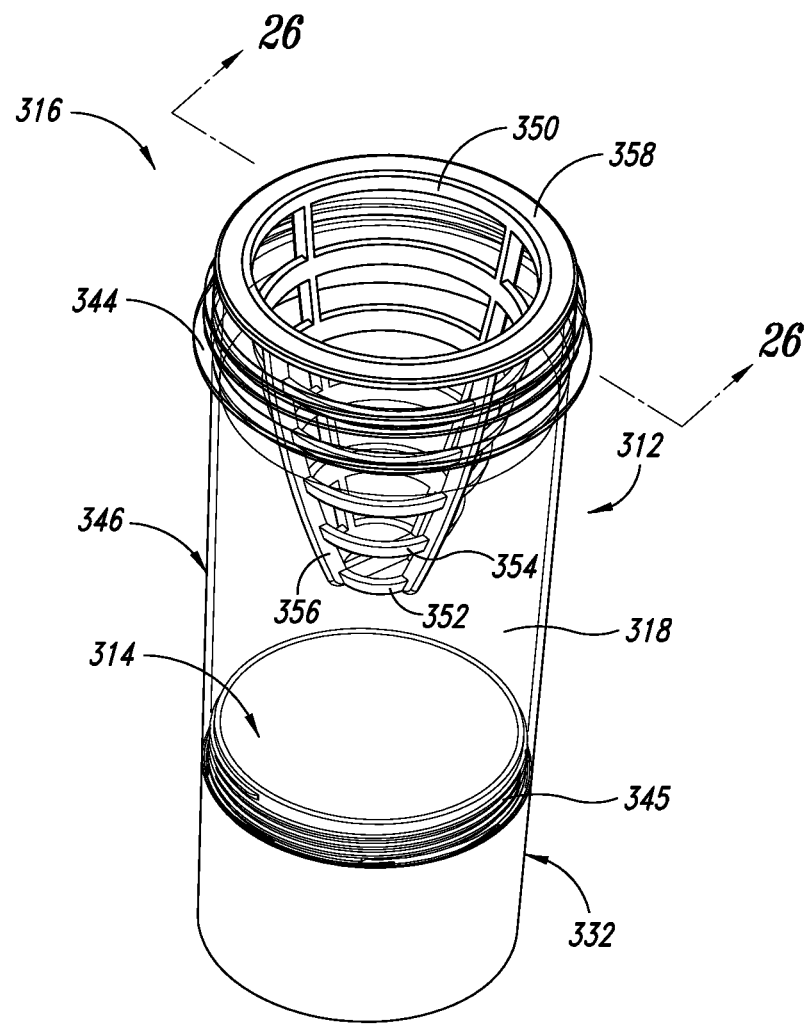
FIG. 25 is an isometric view of the container housing with an alternative embodiment of a mixing element formed in accordance with the present disclosure.
Figure 26:
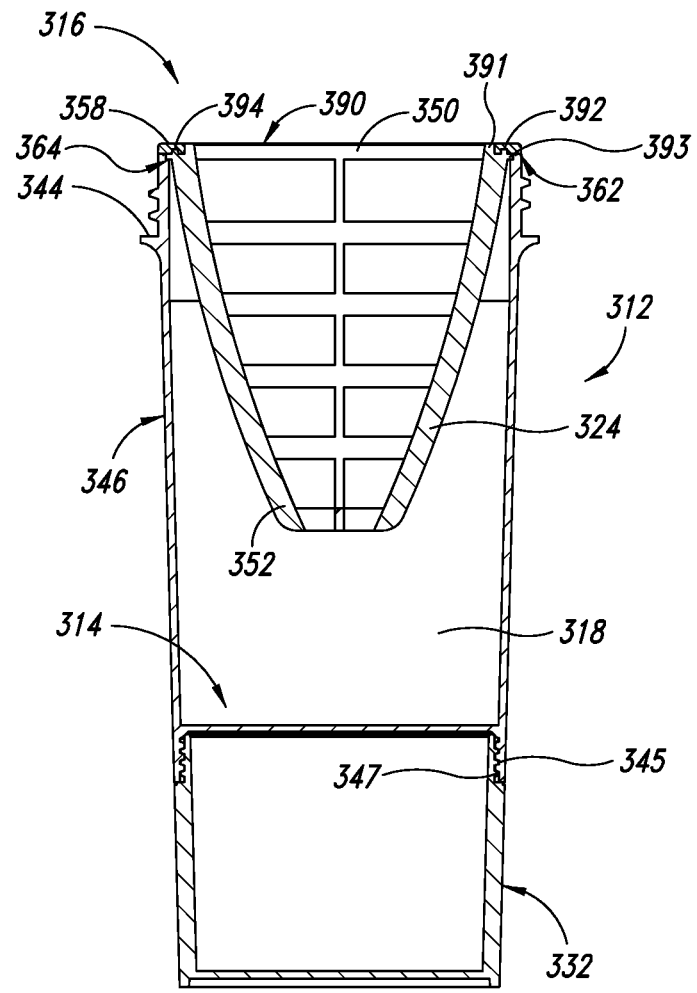
FIG. 26 is a cross-sectional view of the container housing and the mixing element of FIG. 25.

FIGS. 16-26 are alternative embodiments of a mixing container 310 formed in accordance with the present disclosure. Various combinations of a mixing element 324, a lid 320, and a sealing ring 358 will be described with respect to FIGS. 16-26. For example, the sealing ring 358 may be included with the mixing elements 324 as shown in FIGS. 25 and 26.

Alternatively, the sealing ring 358 may be included as a component of the lid 320 as shown in FIGS. 19-24.

Figure 16:
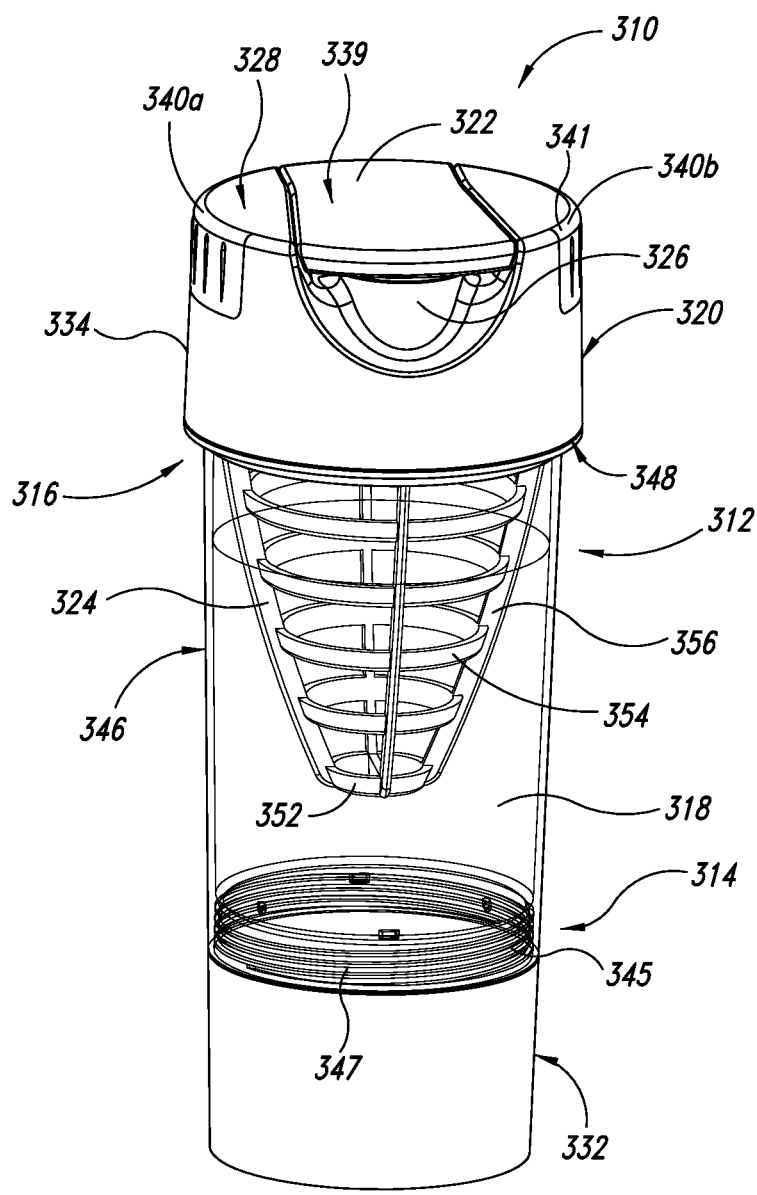
FIG. 16 is an isometric view of a hand-holdable container having a mixing element.

FIG. 16 is an assembled container 310 having the lid 320 coupled to an open top end 316 of a housing 312 and a cup 332 coupled to a closed bottom 314 of the housing 312. The housing 312 includes a plurality of first threads 342 formed adjacent to the open top end 316, see FIGS. 17 and 18. The housing 312 also includes a second plurality of threads 345 positioned adjacent to the closed bottom end 314. The first plurality of threads 342 are protruding threads formed in a spiral configuration that are structured to engage with a plurality of receiving threads 336 formed on an interior surface 338 of the lid 320, see FIG. 19. The second plurality of threads 345 are receiving threads, which are configured to receive a plurality of protruding threads 347 formed on the cup 332. It is to be understood that other means of removably affixing the cup 332 to the housing 312 may be used, such as latches, which may also be used for affixing the lid 320 to the housing 312.

Both the lid 320 and the cup 332 are configured to be twisted into place to securely couple to the housing to each component. When sealed, the closed bottom 314 of the housing 312 and the cup 332 work together to contain powder or some other material to be mixed with a liquid in the housing 312 at a time selected by the user. As will be described in more detail below, the lid 320 or the mixing element 324 include a sealing ring 358 to create a water tight seal to prevent leakage when the container 310 is being transported.

The lid 320 includes a tab 322 that is configured to be pivoted and raised or lowered to move from an open to a closed position and vice versa with respect to a spout 326. The top surface 328 is coplanar with the top surface 339 of the tab 322 so that when the tab is in the closed and locked position, the top surfaces 328 and 339 are flat. The spout 326 may be used for pouring the mixed liquid into the cup 332 or may be used to drink the liquid right out of the container 310 when the spout is in the open or raised position. Proportional pouring may be done by only partially opening the spout.

The housing 312 includes a rim 344 that is below the first threads 342. The rim 344 is configured to abut a bottom surface 348 of the lid 320 when the lid 320 is engaged with the first threads 342.

The lid 320 includes a first and a second gripping member 340a, 340b. The gripping members 340a, 340b may be formed of rubber, silicone, or other suitable resilient material that aid the user in gripping the lid 320. The gripping members allow the user to easily tighten and loosen the lid 320 manually, i.e., using the fingers and hands. The first and second gripping members 340a, 340b are formed to be flush with a sidewall 334 of the lid 320. In addition, the gripping members 340a, 340b have a curved upper portion 341 that transitions with a curvature of the lid from the sidewall 334 to the top surface 328. As will be discussed in more detail below, the gripping members 340a, 340b may be formed simultaneously and integrally with the sealing ring 358, see FIGS. 19, 20.

Figure 17:
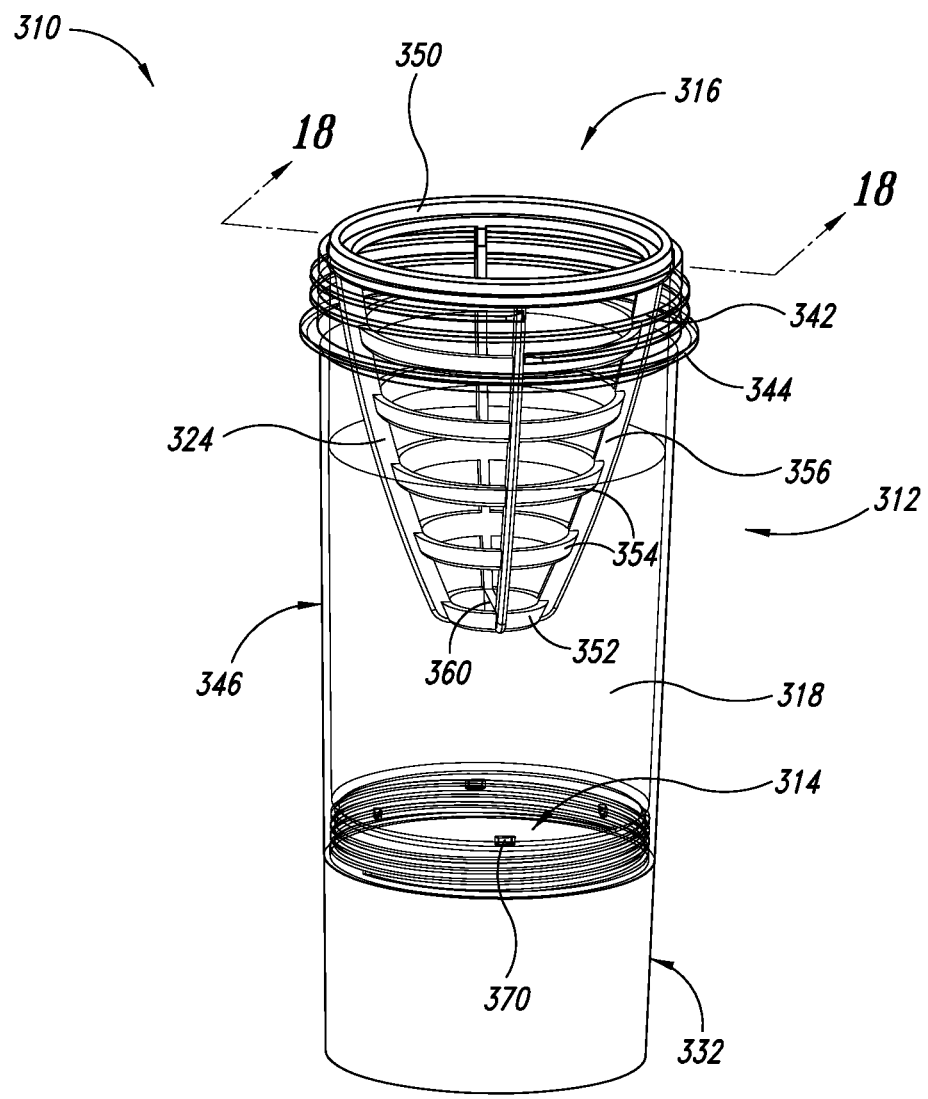
FIG. 17 is an isometric view of a container housing and the mixing element of FIG. 16.

The mixing element 324 includes a plurality of circular members 354 and a plurality of ribs 356, which are coupled together and form a conical shape. The mixing element has a first end 350 and an opposing second end 352, which is smaller than the first end 350. As can be seen in FIG. 17, the first end 350 is configured to abut or rest against the lid near the open end 316 and the second end 352 extends into the hollow interior 318 of the housing 312. In this embodiment, there are six of the circular members 354 that are concentric circles that get progressively smaller from the first end 350 to the second end 352. In other embodiments, the number of circular members 354 may be varied. In addition, there are four ribs 356 evenly spaced around and coupled to the circular members 354. The circular members 354 are also spaced evenly from each other from the second end 352 up to the first end 350. The spacing and number of the circular members 354 is a matter of design choice as well as a performance consideration to ensure the contents will be thoroughly mixed when the housing 312 is manually shaken.

In this embodiment, a cross member 360 is formed across the diameter of the circular member 354 at the second end 352. The cross member 360 is configured to break up powder clumps that may be formed when a user tries to mix the powder with the liquid in the housing 312.

The first end 350 of the mixing element extends above a top surface 362 of the housing 312. A notch or ledge 364 is formed on an interior surface 366 of the housing 312 and provides a surface onto which the mixing element 324 is engaged. The mixing element 324 has an indentation 368 that corresponds to the ledge 364 so that the mixing element 324 fits snugly within the hollow interior 318 of the housing 312 so that the mixing element does not fall into the hollow interior 318 of the housing 312.

Figure 18:
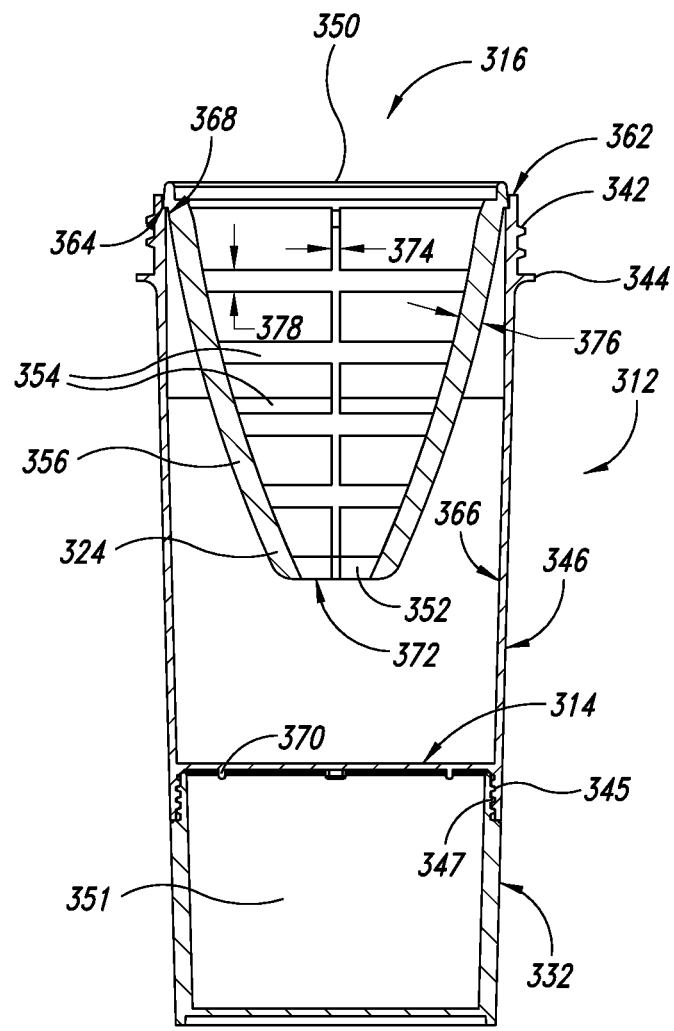
FIG. 18 is a cross-sectional view of the container housing and the mixing element of FIG. 17.

As can be seen in FIG. 18, the closed bottom 314 works with the cup 332 to form a closed compartment 351 in which powder or another mixing substance may be stored until a user desires to make the mixed drink. The cup 332 includes the threads 347 that are engaged with the threads 345 of the housing. In this embodiment, a plurality of notches 370 are included for manufacturing purposes to help prevent breakage of the cup when it is removed from a mold. The notches 370 are optional and may be omitted.

In this embodiment, the mixing element 324 has a flat bottom surface 372 that is formed in association with the second end 352. Each rib has a first dimension 374 that is smaller than a second dimension 376. The first dimension 374 of the ribs 356 is smaller than a dimension 378 of the circular members 354.

Figure 19:
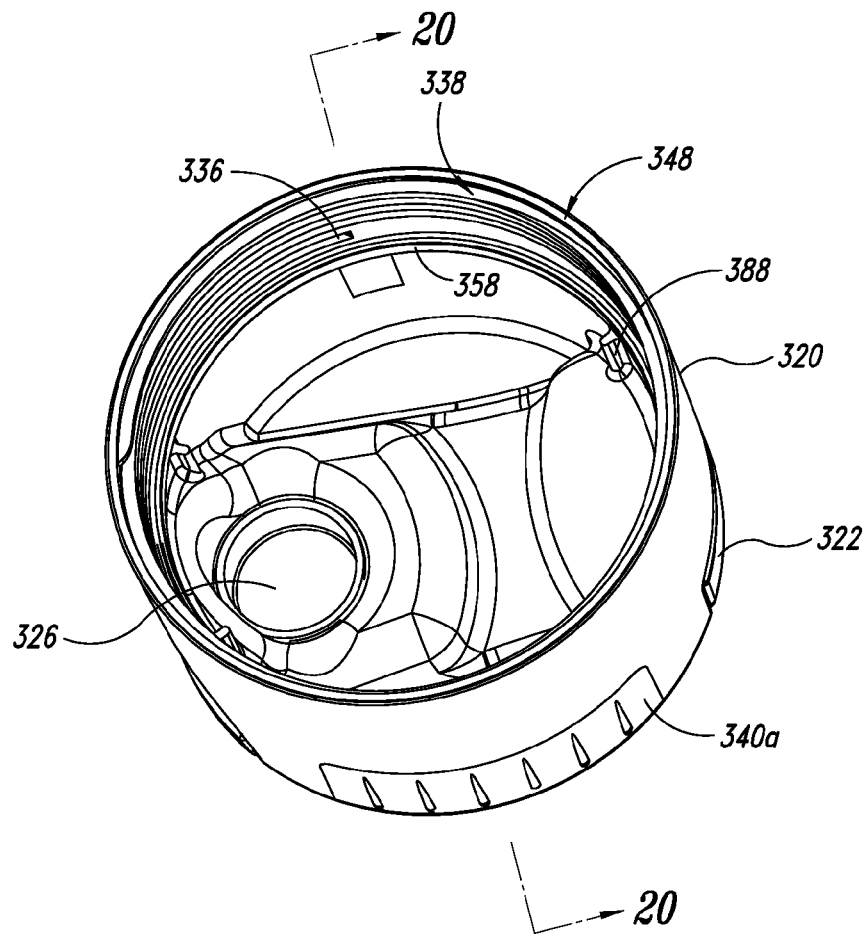
FIGS. 19-24 are isometric bottom views and cross-sectional views of a lid formed in accordance with embodiments of the present disclosure.
Figure 20:
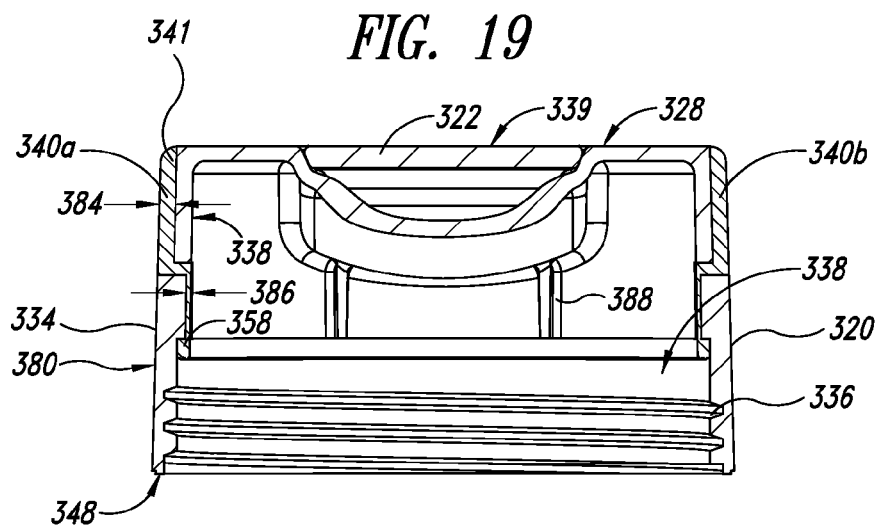

FIGS. 19-24 are alternative embodiments of the lid 320 having different arrangements of the sealing ring 358 formed in accordance with embodiments of the present disclosure. FIG. 19 is the lid 320 having the first and second gripping members 340a, 340b formed of a rubber, silicone, or other suitable material that provides a user with a means of gripping the lid 320 to assist the user in opening the lid 320. The gripping members 340a, 340b are coupled to the sealing ring 358 through a sidewall 334 of the lid. In particular, the sidewall 334 has an exterior surface 380 and an interior surface 338. The first and second gripping members 340a, 340b are flush with the exterior surface 380, while the interior surface 338 is flush with the sealing ring 358. The gripping members 340a, 340b have a first dimension 384 which is larger than the second dimension 386 of the sealing ring 358, see FIG. 20.

As mentioned above, the first and second gripping members 340a, 340b have a curved upper portion that transitions from the exterior surface 380 to a top surface 328 of the lid 320 so that the gripping members transition smoothly from the sidewalls 334 to the top surface 328. The lid 320 also includes protrusions 338 that may be configured to provide a support to keep the mixing element 324 in place. In addition to the protrusions 388, the sealing ring 358 works in conjunction with the second end 350 of the mixing element and the top surface 362 of the housing 312 to form a watertight seal to prevent any leakage from the assembled container 310.

The interior surface 338 of the lid 320 includes the plurality of threads 336 which are configured to engage with the first threads 342 of the housing 312. The lid 320 includes the tab 322, which also has the surface 339 that is coplanar with the top surface 328 of the lid 320.

Figure 21:
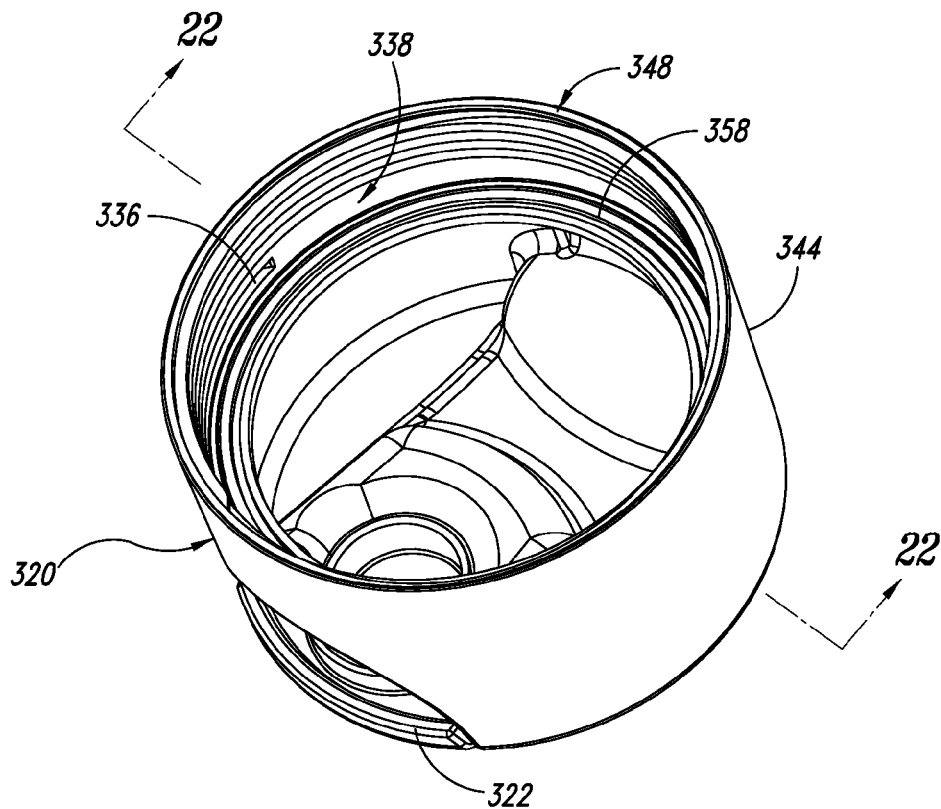
Figure 22:
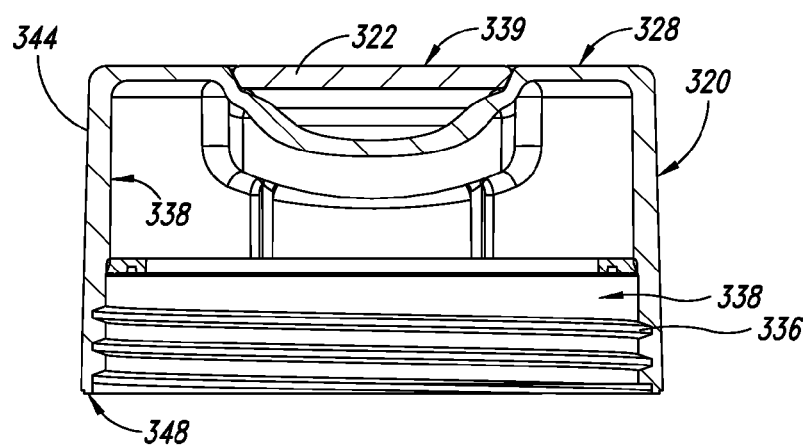

FIG. 21 is an alternative embodiment of the lid 320 having the tab 322. In this embodiment, the sidewalls 346 are all one smooth piece of material and do not include the gripping members of FIGS. 19 and 20. The sealing ring 358 is formed adjacent to the interior surface 338 of the lid at a central location between the threads 336 and the top surface 328. In this embodiment, the sealing ring 358 is configured to interact with the top surface 362 of the housing 312 and with the first end 350 of the mixing element 324 to create a watertight seal to prevent the liquid from unintentionally escaping from the container 310.

Figure 23:
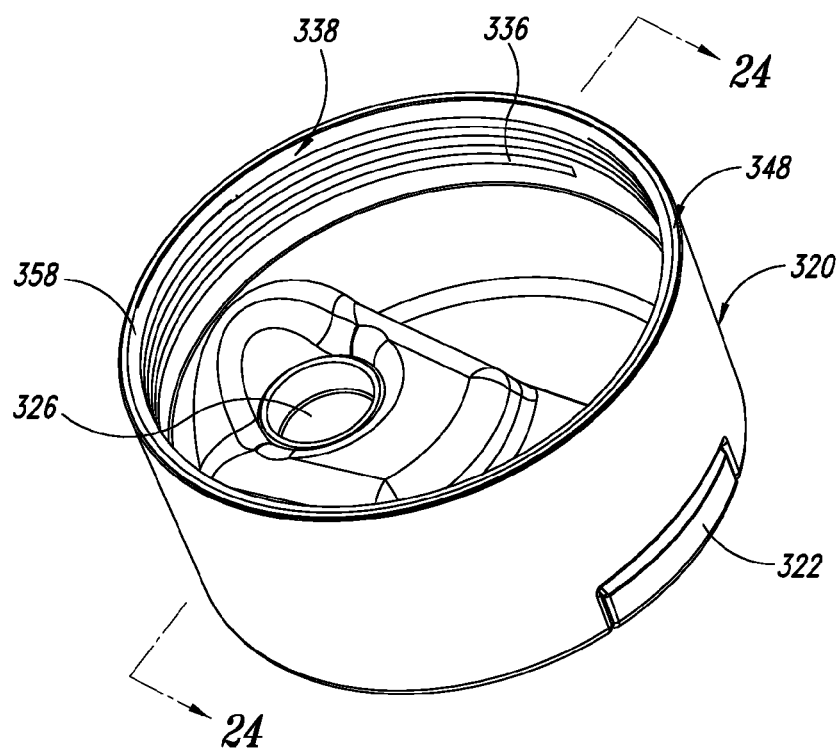
Figure 24:
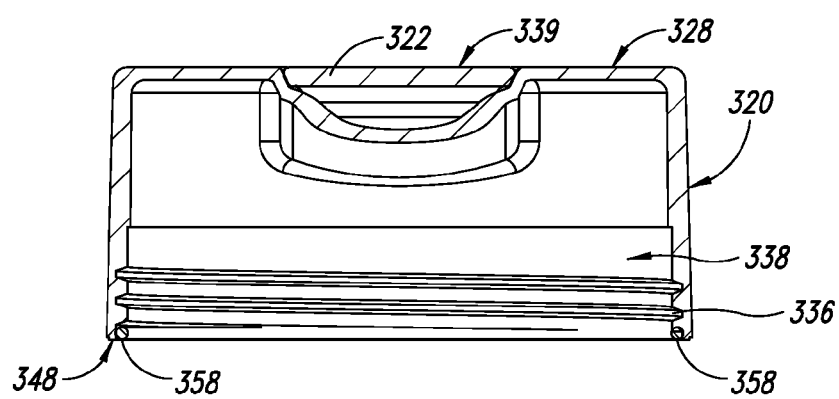

FIG. 23 is another embodiment of the lid 320 having the tab 322. In this embodiment, the sealing ring 358 is formed adjacent to a bottom surface 348 of the lid 320. In this embodiment, the sealing ring 358 forms a seal with the rim 344 of the housing 312.

FIG. 25 is an alternative configuration of the mixing element 324 having the sealing ring 358 formed as an integral component of the first end 350 of the mixing element. As can be seen in the cross-sectional view taken through 26-26 of FIG. 25, the sealing ring 358 is coplanar with a top surface 390 of the first end 350 of the mixing element 324. In this embodiment, the mixing element includes a ridge 392 that is received in a groove 394 in the sealing ring 358. The mixing element 324 may be attached to the sealing ring 358 by overmolding or other bonding process so that the sealing ring is not easily removed from the mixing element 324.

The first end 350 of the mixing element 324 is configured to receive and be merged with the sealing ring 358 to make the smooth top surface 390. In this embodiment, the first end 350 includes an interior ridge 391 that is higher than a portion 393 of the mixing element 324 that sits on the ledge 364 of the housing 312.

The sealing ring 358 is configured to rest on the top surface 362 of the housing 312. When the lid 320 is fully engaged with the threads 342 of the housing, interior portions of the lid abut the sealing ring 358 to prevent liquid in the container from exiting the housing 312. In other embodiments, the sealing ring 358 may be a stand-alone piece that can be removed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed:

1. A hand-held device for mixing, the device comprising:
   a housing having an interior defined by at least one wall and a closed bottom, the wall having a top surface;
   a lid structured to be removably attached to the housing, the lid having a sealable spout;
   a storage compartment structured to be removably attached to the closed bottom of the housing; and
   a removable mixing element having a plurality of openings formed from an intersection of a plurality of ribs and a plurality of round connection members, a first one of the round connection members being configured to rest on the top surface of the wall.

2. The device of claim 1 wherein the mixing element has a conical shape, the first one of the round connection members having a first diameter and a second one of the round connection members having a second diameter that is less than the first diameter, the second one of the round connection members being structured to be positioned in the interior of the housing.

3. The device of claim 2 wherein the mixing element includes a third one of the round connection members, the first, second, and third ones of the round connection members are concentric circular rings aligned along a longitudinal axis, the third one being between the first one and the second one.

4. The device of claim 3 wherein the third one of the round connection member has a third diameter that is less than the first diameter and more than the second diameter.

5. The device of claim 3 wherein:
   the plurality of openings include a first set positioned between the first one and the third one of the connection members and a second set positioned between the third one and the second one of the connection members, each opening of the first set of openings having a first area and each opening of the second set of openings having a second area, the first area being larger than the second area.

6. The device of claim 1 wherein the second one of the round connection members includes a rigid bar that extends from one side of the second one to another side of the second one.

7. The device of claim 2 wherein the lid includes:
   a sidewall having an exterior surface and an interior surface;
   a plurality of threads on a portion of the interior surface of the sidewall; and
   a compliant sealing member on the interior surface of the sidewall.

8. The device of claim 7 wherein the lid further includes a first and second gripping member, each gripping member having a first portion that forms a portion of the exterior surface of the sidewall, a second portion that meets a top surface of the lid, and a third portion that couples to the compliant sealing member on the interior surface of the sidewall, the third portion passing from the exterior surface of the sidewall to the interior surface of the sidewall.

9. The device of claim 1 wherein the top surface of the wall is a stepped top surface.

10. A device for mixing, the device comprising:
    a housing having an open end, a closed end, and an interior defined by at least one wall that separates the open end and the closed end, the housing also including a ledge positioned on a first surface of the wall adjacent to the open end;
    a lid structured to be removably attached to the housing, the lid having a sealable spout;
    a storage compartment structured to be removably attached to the closed end of the housing; and
    a mixing element having a first end and a second end that is narrower than the first end, the first end configured to be received in the interior of the housing and supported on the housing by the ledge, the mixing element including:

a plurality of openings;

a plurality of vertically oriented ribs; and a plurality of horizontally oriented members integrally formed with the ribs to form the plurality of openings.

11. The device of claim 10 where in the housing includes a first plurality of threads on an exterior surface of the wall adjacent to the open end and a second plurality of threads on an interior surface of the wall adjacent to the closed end, the first plurality of threads configured to cooperate with a third plurality of threads on an interior surface of the lid and the second plurality of threads configured to cooperate with a fourth plurality of threads on an exterior surface of the storage compartment.

12. The device of claim 10 wherein the lid includes a sidewall having an exterior surface and an interior surface;

a plurality of threads on a portion of the interior surface of the sidewall; and a compliant sealing member on the interior surface of the sidewall.

13. The device of claim 12 wherein the lid further includes a first and second gripping member, each gripping member having a first portion that forms a portion of the exterior surface of the sidewall, a second portion that meets a top surface of the lid, and a third portion that couples to the compliant sealing member on the interior surface of the sidewall, the third portion passing from the exterior surface of the sidewall to the interior surface of the sidewall.

14. The device of claim 10 wherein the plurality of openings include a first set and a second set, each of the first set having a larger area than each of the second, the first set being closer to the ledge than the second set is to the ledge.

15. The device of claim 14 wherein each opening of the first set has a first length and a first width and each opening of the second set has a second length and a second width, the first length being greater than the second length.

16. The device of claim 10 wherein the horizontally oriented members are circular in shape, a first one of the members having a first diameter, a second one of the members having a second diameter, the first diameter being larger than the second diameter.

17. The device of claim 16 wherein the first one of the members is configured to rest on the top surface of the open end of the housing.

* * * * *